United States Patent
Stroh

(10) Patent No.: US 7,428,457 B2
(45) Date of Patent: Sep. 23, 2008

(54) METHOD FOR INTERPRETING DRIVER REQUESTED AXLE TORQUE

(75) Inventor: David J. Stroh, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 689 days.

(21) Appl. No.: 10/786,642

(22) Filed: Feb. 25, 2004

(65) Prior Publication Data

US 2005/0187696 A1 Aug. 25, 2005

(51) Int. Cl.
*G06F 17/00* (2006.01)
(52) U.S. Cl. .............................. 701/51; 701/55; 701/56; 180/338; 477/107; 477/110; 477/115
(58) Field of Classification Search ................... 701/51, 701/55, 56; 180/338; 477/107, 110, 115
See application file for complete search history.

(56) References Cited

U.S. PATENT DOCUMENTS

| | | | | |
|---|---|---|---|---|
| 5,738,606 A | * | 4/1998 | Bellinger | ..................... 477/111 |
| 6,067,495 A | * | 5/2000 | Fliearman et al. | ............. 701/55 |
| 6,511,399 B2 | * | 1/2003 | Mc Collum Etchason et al. | ........................... 477/107 |
| 6,547,697 B1 | * | 4/2003 | Taffin et al. | .................. 477/109 |
| 2001/0029414 A1 | * | 10/2001 | Nada | ........................... 701/34 |
| 2005/0187696 A1 | * | 8/2005 | Stroh | .......................... 701/84 |

FOREIGN PATENT DOCUMENTS

DE 10114273 C2 10/2002
DE 10204083 A1 8/2003

OTHER PUBLICATIONS

Riso National Laboratory, "The WAsP air density calculator." Accessed Mar. 6, 2007. http://www.risoe.dk/vea/projects nimo/Wasphelp/Wasp8.htm#aboutairdensitycalculator.htm.*

* cited by examiner

*Primary Examiner*—Khoi H. Tran
*Assistant Examiner*—Marie A Weiskopf

(57) ABSTRACT

A torque request generation system for use with a coordinated torque control system of a vehicle includes an input receiving a vehicle speed and an axle torque command. A datastore records a three-dimensional torque surface defined in terms of a coordinate system having a first axis related to the axle torque command, a second axis related to the vehicle speed, and a third axis related to an axle torque request. A torque request generation module accesses the datastore and generates a torque request based on a correlation between the axle torque command and the vehicle speed respective of the three-dimensional torque surface.

14 Claims, 9 Drawing Sheets

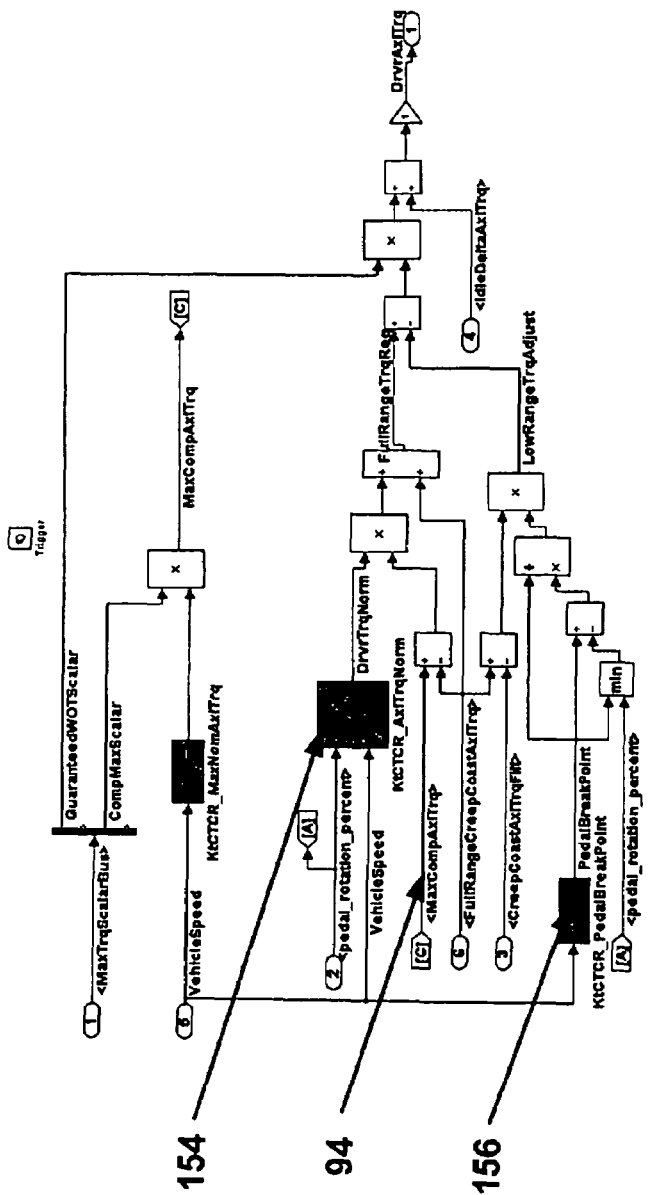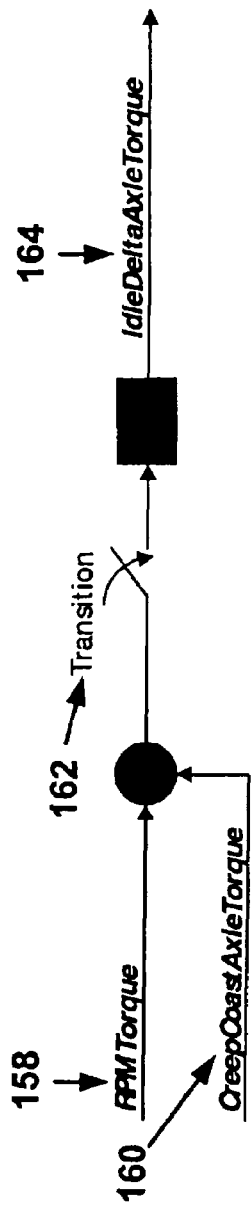
*Figure - 9A*
*Figure - 9B*

METHOD FOR INTERPRETING DRIVER REQUESTED AXLE TORQUE

FIELD OF THE INVENTION

The present invention generally relates to torque control in a vehicle, and more particularly to interpretation of a pedal command as a torque request.

BACKGROUND OF THE INVENTION

A coordinated axle torque control system interprets the amount of torque requested by the driver. The control System acts upon the torque request to accelerate or decelerate the vehicle. Typically, it is necessary to interpret accelerator pedal position as a torque request to deliver the desired drivability.

Accomplishing desired drivability is a complicated affair. For example, it is desirable for the vehicle to respond immediately as the driver tips into the pedal. In other words, there should be no dead zone in the initial pedal travel that yields zero response. Also, it is desirable to accomplish full extraction of the maximum amount of torque available form the power train when the pedal is fully depressed. In other words, there should be no untapped torque capability or dead zone at the end of pedal travel despite variability in torque capability between individual engines. These drivability characteristics should also be obtained despite variation in torque capability of an engine due to changes in ambient conditions, such as temperature and air pressure.

SUMMARY OF THE INVENTION

In accordance with the present invention, a torque request generation system for use with a coordinated torque control system of a vehicle includes an input receiving a vehicle speed and an axle torque command. A datastore records a three-dimensional torque surface defined in terms of a coordinate system having a first axis related to the axle torque command, a second axis related to the vehicle speed, and a third axis related to an axle torque request. A torque request generation module accesses the datastore and generates a torque request based on a correlation between the axle torque command and the vehicle speed respective of the three-dimensional torque surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a set of flow diagrams illustrating an alternate method according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
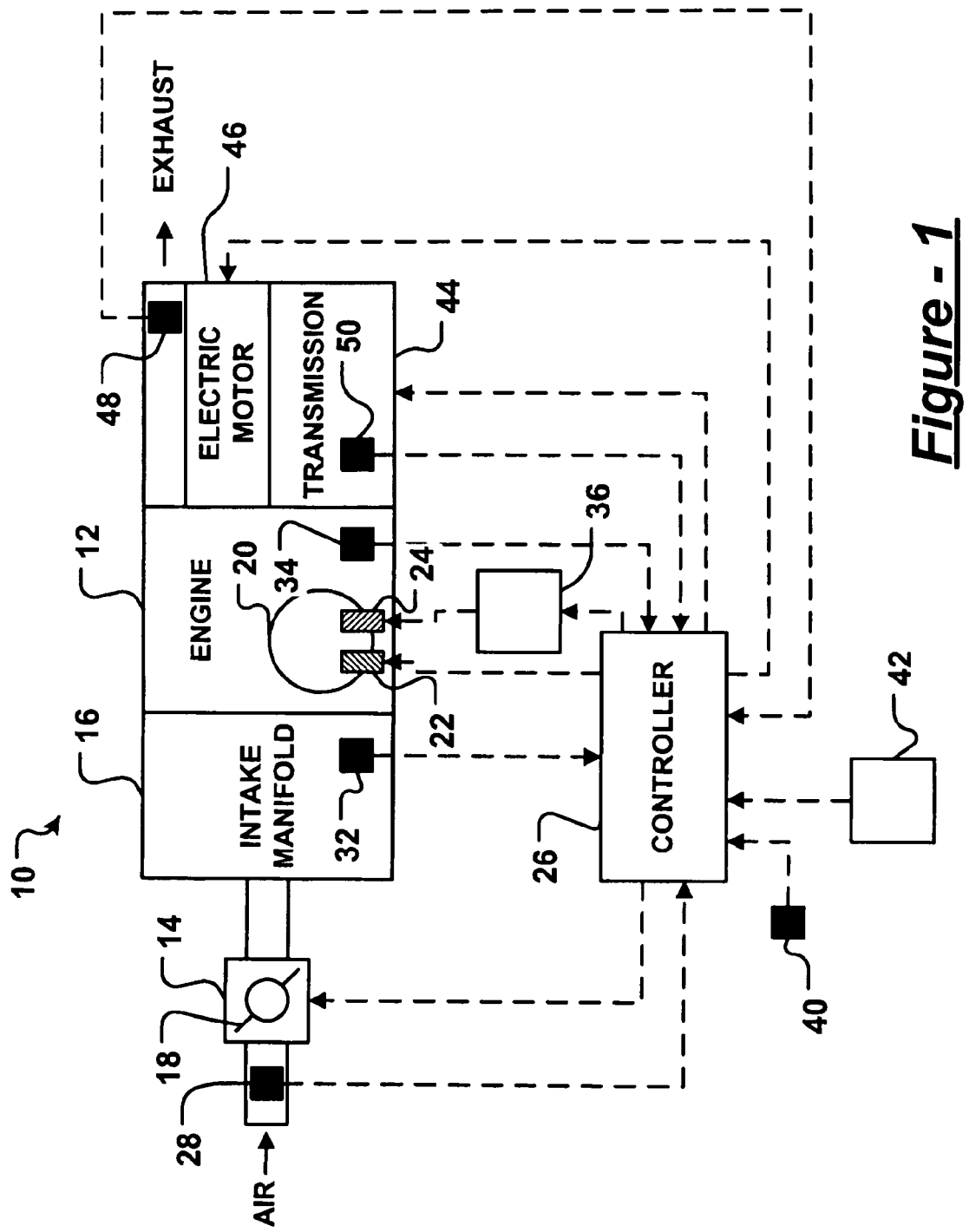
FIG. 1 is a functional block diagram illustrating a coordinated torque control system implementing the torque request generation technique according to the present invention.

Referring now to FIG. 1, an engine control system 10 includes an engine 12 with a throttle 14 and an intake manifold 16. Air flow through the throttle 14 and into the intake manifold 16 is related to a position of a throttle plate 18. Air flows into individual cylinders 20 of the engine 12. Although only a single cylinder 20 is shown, it can be appreciated that the engine 12 typically includes multiple cylinders 20. The cylinder 20 includes a piston (not shown) that compresses an air/fuel mixture. More specifically, air flow into the cylinder 20 is mixed with fuel injected by a fuel injector 22. A spark plug 24 ignites the compressed air/fuel mixture in a combustion process to produce engine torque, which is in turn applied to an axle (not shown) via transmission 44. In a hybrid vehicle, electric motor 46 may also produce torque. Torque from motor 46 is similarly applied to the axle via transmission 44.

One or more controllers 26 adjust engine torque, motor torque, and transmission gear. For example, controllers 26 adjust the engine torque based on a requested torque. The controllers 26 dynamically control a rate of torque change delivered by the engine 12 by controlling the position of throttle plate 18, and by controlling the number of active cylinders for displacement on demand. Controllers 26 communicate with a mass air flow (MAF) sensor 28, a manifold absolute pressure (MAP) sensor 32, and an engine speed sensor 34. The MAF sensor 28 generates a signal related to the amount of air flow through the throttle 14. The MAP sensor 32 generates a signal related to the pressure within the intake manifold 16. The engine speed sensor 34 generates a signal related to engine speed (RPM). Controller 26 also communicates with the fuel injector 22 to control the fuel rate provided to the cylinder 20 and an ignition system 36 to control timing of the ignition spark based on sensed air flow and pressure. Also, controller 26 selects the transmission gear and varies the voltage applied to electric motor 46.

Controller 26 receives various input signals indicating vehicle conditions. For example, an ambient temperature signal is generated by ambient temperature sensor 40. Also, an ambient air pressure signal is generated by MAF sensor 28 by adjusting sensed mass air flow for the pressure drop across the air intake valve. Alternatively, the pressure signal may be sensed intermittently by taking a pressure reading before engine startup. Further, an oxygen level signal is generated by oxygen sensor 48 of engine exhaust system 48. Yet further, a vehicle speed signal is generated by pulley speed sensor 50 of transmission 44. It is envisioned that vehicle speed may alternatively be generated by wheel speed sensors or other speed sensing mechanisms.

The controller 26 includes a processor and memory. The memory includes an electronic data storage flash memory, erasable programmable read-only memory (EPROM), electrically erasable programmable read-only memory (EEPROM), read only memory (ROM), flash memory or a one time programmable (OTP) memory. The controllers 26 execute coordinated torque control in accordance with a torque request interpreted from a pedal command received from user input device 42, such as an accelerator pedal, a hand operated throttle control, or a computer-based input device. Typically, the pedal command is a signal indicating position of input device 42. Controllers 26 include a coordinated torque control system and a torque request generation module interpreting the pedal command for the coordinated torque control system.

Figure 2:
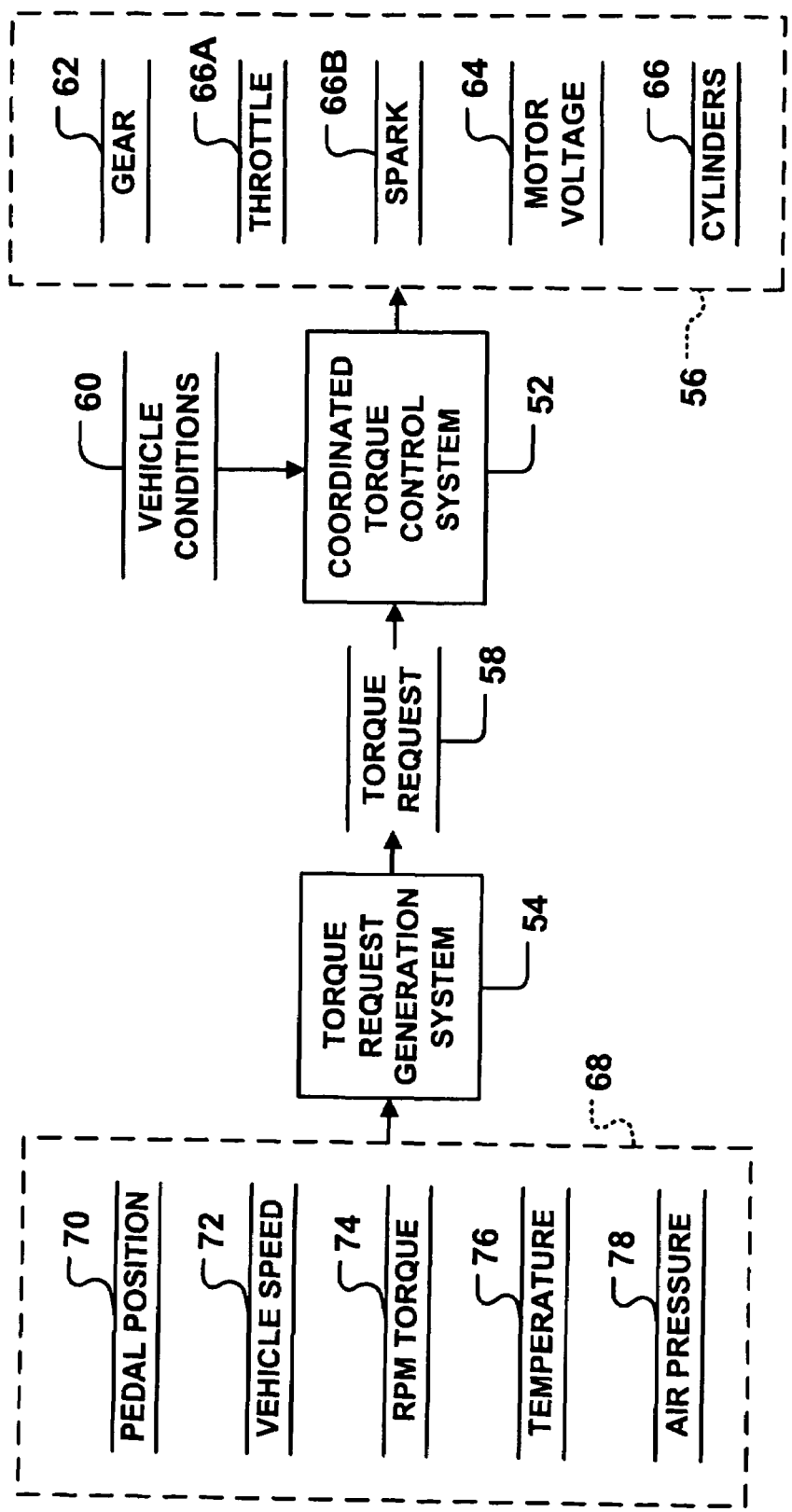
FIG. 2 is a block diagram illustrating interaction between the coordinated torque control system and the torque request generation system according to the present invention.

Turning to FIG. 2, the interaction between coordinated torque control system 52 and torque request generation system 54 is illustrated. As discussed above, coordinated torque control system generates torque control signals 56 based on torque request 58 and vehicle conditions 60. Torque control signals 56 include gear control signal 62 for the transmission, voltage control signal 64 for the electric motor, and throttle, spark, and displacement on demand control signals 66A-C. It should be readily understood that system 52 is adapted to operate fuel injectors according to air mass resulting from throttle position.

Torque request 58 is generated by system 54 based on various system inputs 68. The inputs include pedal command 70, vehicle speed 72, real-time minimum torque 74, ambient temperature 76, and ambient air pressure 78. Pedal command 70 typically corresponds to a signal from the driver input device that indicates the position of the device. Vehicle speed typically corresponds to a filtered transmission pulley speed signal from sensor 50 (FIG. 1), wheel speed, or similar vehicle component speeds indicative of vehicle speed. Real-time minimum torque 74 (FIG. 2) is typically determined by an idle speed algorithm based on air mass per cylinder, spark, fuel, and engine speed. Ambient temperature 76 typically corresponds to a signal from sensor 40 (FIG. 1). Ambient air pressure 78 (FIG. 2) typically corresponds to a filtered signal from sensor 28 (FIG. 1) as discussed above.

Figure 3:
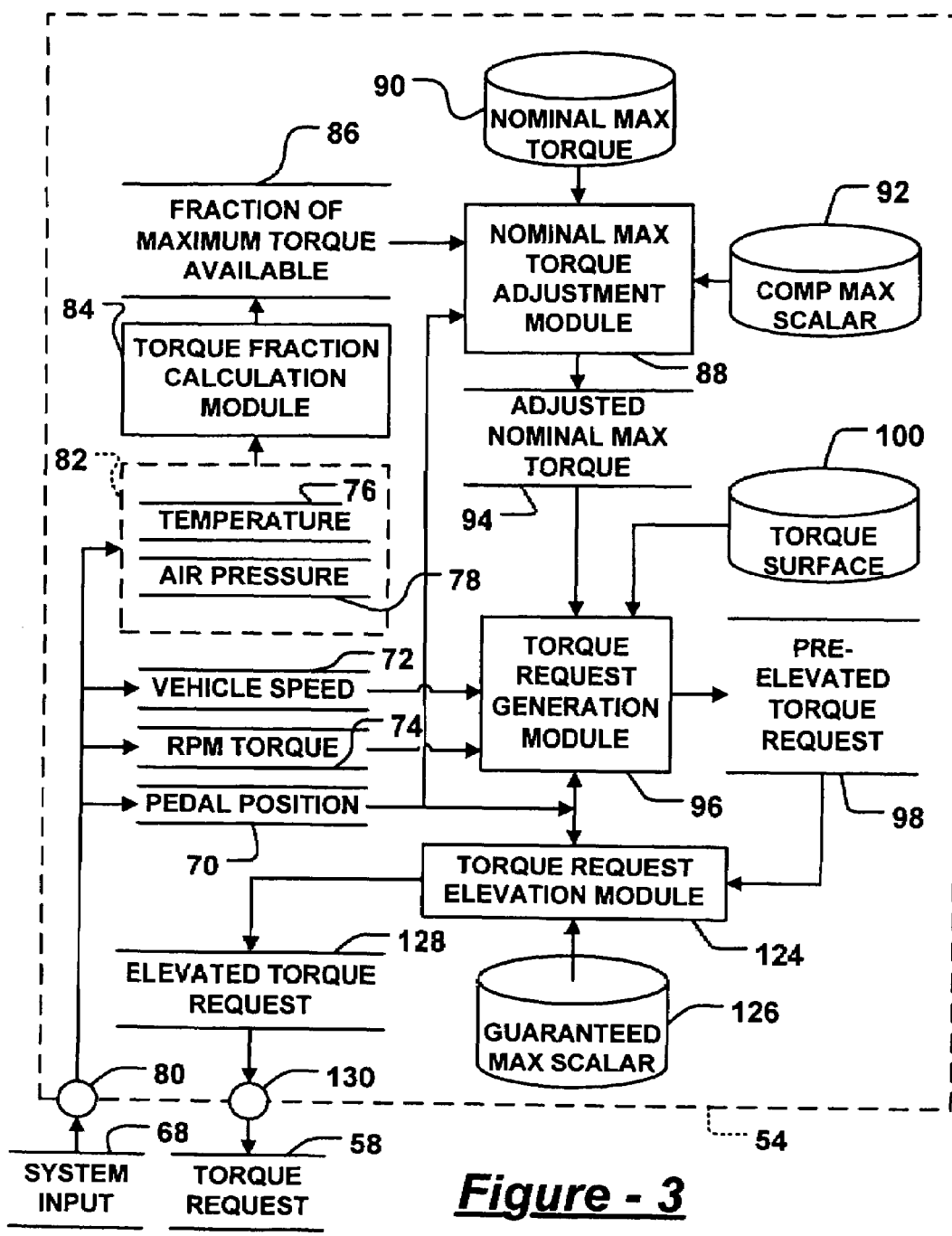
FIG. 3 is a block diagram illustrating the torque request generation system according to the present invention.

FIG. 3 illustrates torque request generation system 54 in more detail. System input 68 is received via input 80 and communicated to various modules. For example, ambient conditions 82, including ambient temperature 76 and ambient air pressure 78, are communicated to torque fraction calculation module 84. In turn, module 84 determines a fraction of maximum torque available 86 as the product of a ratio of actual temperature to standard temperature and a square root of a ratio of actual pressure to standard pressure. Then, nominal max torque adjustment module selects a nominal max torque 90 based on pedal command 70 and adjusts it according to the fraction of maximum torque available 86. The adjustment procedure employs a comp max scalar 92 to govern the adjustment process as further explained below with reference to FIG. 8. This adjustment procedure results in an adjusted nominal max torque 94 that accounts for variability in ambient conditions.

Figure 8:
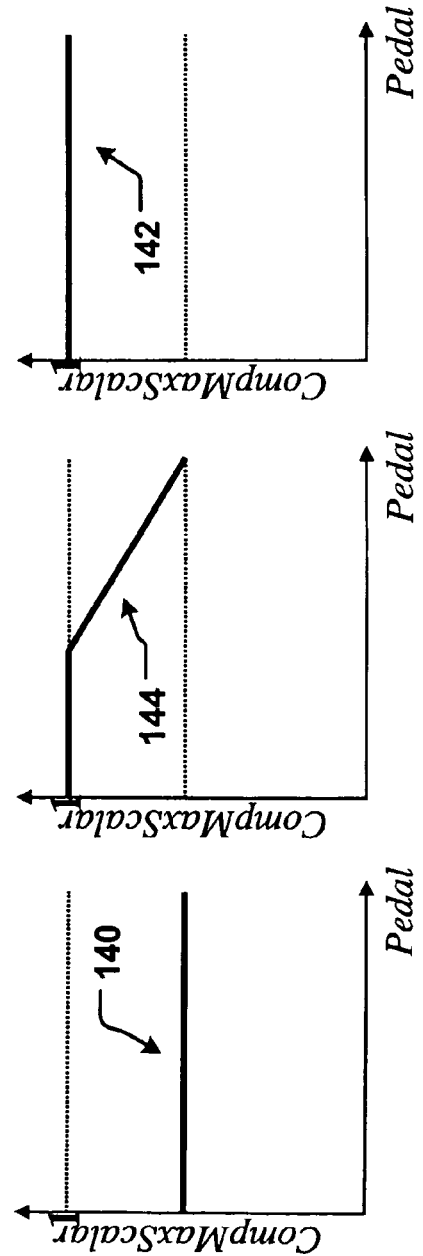
FIG. 8 is a set of two-dimensional graphs illustrating adjustment of nominal maximum torque to compensate for variations in ambient conditions in accordance with the present invention.

Comp max scalar 92 is developed as a function of pedal position and is shown in FIG. 8. A CapScalar value ranges between zero and one and indicates the fraction of the nominal maximum torque available. The CompMaxScalar is applied to the nominal max torque. Should no compensation be desired, the CompMaxScalar is simply calibrated as a straight line 140 equal to the CapScalar. If full compensation is desired, the CompMaxScalar is calibrated as a straight line 142 equal to unity. If partial compensation is desired, the CompMaxScalar takes on a value of unity for a portion of pedal travel, then ramps to the CapScalar as at 144. There are trade-offs for each case. While the case of full compensation provides identical driveability impervious to ambient changes, it will reach a point where the torque capability is exceeded, which results in a dead zone at the end of pedal travel. For the case of no compensation, the driveability will change with ambient conditions, but no dead zone will be created at the end of pedal travel. As a compromise, partial compensation will deliver identical driveability for a portion of pedal travel, but will then scale down the request to the capability to avoid a dead zone at the end of pedal travel.

Figure 6A:
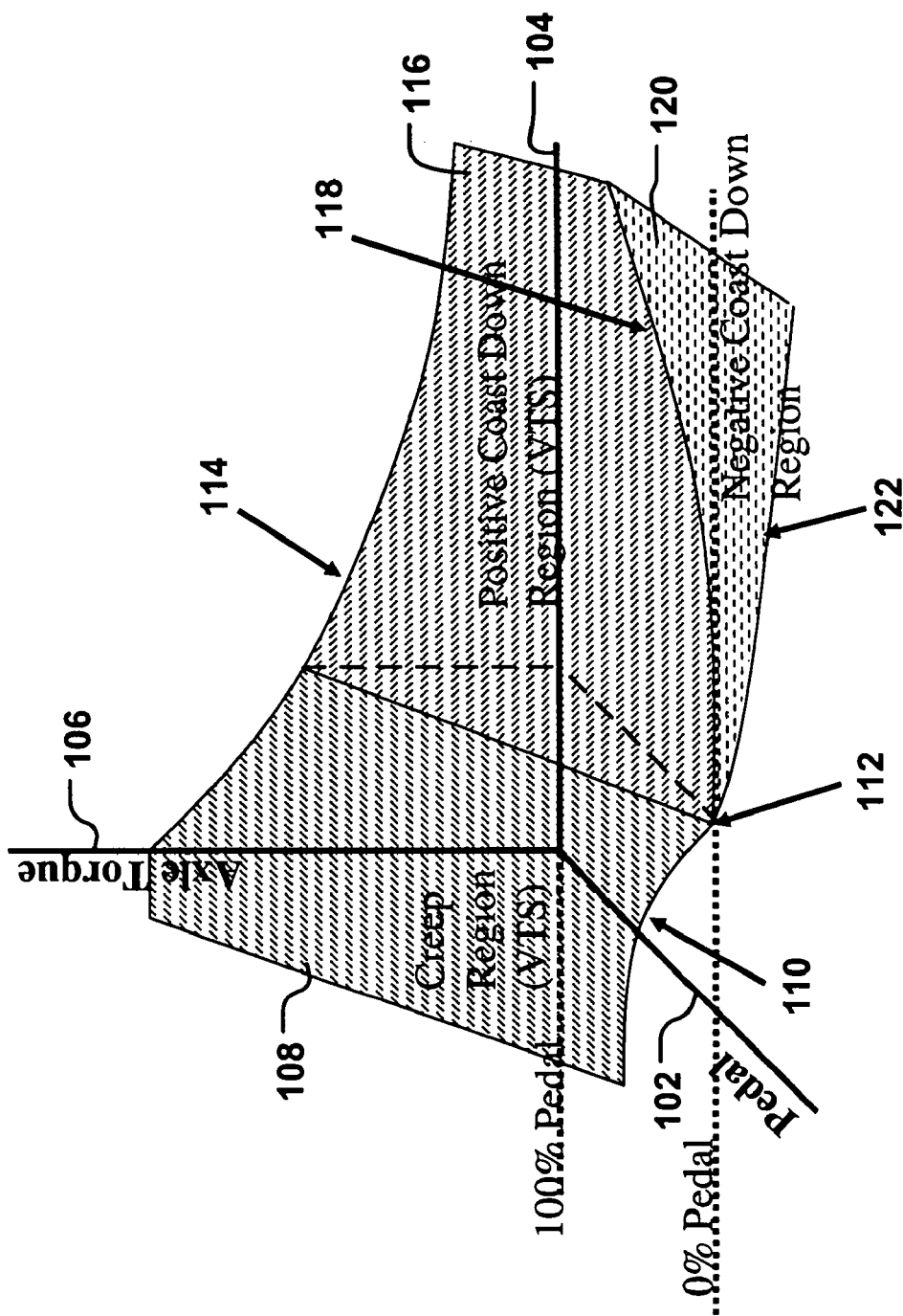
FIG. 6 is a rising view of the three-dimensional torque surface according to the present invention.

Torque request generation module 96 is adapted to generate a pre-elevated torque request 98 based on adjusted nominal max torque 94, vehicle speed 72, real-time minimum torque 74, pedal command 70, and three-dimensional torque surface datastore 100. The three-dimensional torque surface of datastore 100 is discussed further below with reference to FIG. 6A. The surface is defined in terms of a coordinate system having a first axis 102 related to the axle torque command, a second axis 104 related to the vehicle speed, and a third axis 106 related to an axle torque request. Torque request generation module 96 (FIG. 3) accesses datastore 100 and generates pre-elevated torque request 98 based on a correlation between axle torque command 70 and vehicle speed 72 respective of the three-dimensional torque surface.

Torque request generation module 96 selectively references three regions of the surface. For example, a creep region 108 (FIG. 6) is defined with respect to a creep torque curve 110, a creep speed threshold 112, and a nominal maximum axle torque curve 114. Also, a positive coast down region 116 is defined with respect to the creep speed threshold 112, the nominal maximum axle torque curve 114, and a pedal breakpoint curve 118. Further, a negative coast down region 120 is defined with respect to the pedal breakpoint curve 118 and a coast down torque curve 122. Nominal maximum axle torque curve 114 resides in a plane formed by the second and third axes 104 and 106. Creep torque curve 110 and coast down torque curve 122 reside in a plane parallel to the plane formed by the second and third axes 104 and 106, and situated to intersect a zero pedal command. Axis 102 is related to one hundred percent pedal command at the origin of the coordinate system. Pedal breakpoint curve 118 resides in a plane formed by axes 102 and 104, and intercepts the creep speed threshold 112 in proximity to zero pedal command.

Creep speed threshold 112 corresponds to a vehicle speed at which creep torque ends and coast down torque begins. Creep torque is the minimum positive axle torque at relatively low vehicle speed, and is responsible for vehicle creep at zero pedal command. Coast down torque is the minimum negative torque at relatively high vehicle speeds responsible for the way the vehicle coasts at zero pedal command. Maximum nominal axle torque is the maximum axle torque provided by a nominal engine at standard ambient conditions at one-hundred percent pedal command.

Module 96 (FIG. 3) employs one or more normalization functions to normalize vehicle speed 72 and/or axle torque command 70. It references creep region 108 (FIG. 6) and positive coast down region 116 using nominal maximum axle torque curve 114. The relevant point of curve 114 is adjusted as necessary to account for changes in torque capacity due to ambient conditions as detailed above. When referencing creep region 108, module 96 (FIG. 3) normalizes vehicle speed between zero and one. When referencing positive coast down region 116 (FIG. 6), module 96 (FIG. 3) adjusts vehicle speed based on creep speed threshold 112 (FIG. 6). Adjusted maximum nominal axle torque is typically multiplied by a percent of pedal travel or equivalent pedal command input value. The normalized speed value is typically employed to find the minimum torque on the creep or coast curve. The maximum nominal axle torque is adjusted for the minimum torque before and after the multiplication to obtain the torque request. It is necessary, however, to take the output of the idle speed control algorithm into account in some instances.

In order to avoid stalls when the driver is off the pedal for conventional engines, the creep torque and coast down torque must be adjusted to the output of the idle speed control algorithm. When the driver tips in, dead pedal or discontinuity results if the torque request at that moment is not equal to that of the real-time coast down torque. Therefore, it is necessary to initialize the minimum torque to the real-time coast down torque to ensure a smooth transition. Therefore, the real-time coast down torque is received as input. However, fluctuations in the minimum torque may cause distortion in the axle torque surface and potentially cause it to change unexpectedly. This change is slow with respect to creep torque since it varies as a function of idle set speed and temperature conditions. Therefore, the variation is not a problem for creep torque. Coast down torque, however, is a function of gear, which can change rapidly during a gear shift.

The creep speed threshold is a function of the idle set speed. As the idle set speed moves, the creep speed threshold shifts to the right or left accordingly. Pedal breakpoint curve 118 is supplied to compensate for rapid variability of the coast down torque resulting from fast change of gear during a shift. The breakpoint curve 118 divides the coast down torque region into separate regions with different scheduling functions that prevent the rapid variability from affecting the entire pedal progression. Also, to avoid abrupt changes to the torque request after the driver tips in, a filter is applied to the real-time coast down torque. This filter is bypassed during rpm control mode to ensure the torque is not initialized to a phase-delayed minimum torque. Thus, module 96 (FIG. 3) references negative coast down region 120 (FIG. 6) by linearly scheduling the torque request between the real-time coast down torque 74 and zero torque. As a result, the generated torque request is able to deliver the desired drivability for positive torque. Also, it is able to adjust to the actual minimum for negative torque to ensure that no dead zone or discontinuity exists as the driver tips into the pedal. The details of the calculations performed by module 96 are explored below with reference to FIGS. 4 and 5.

Figure 4:
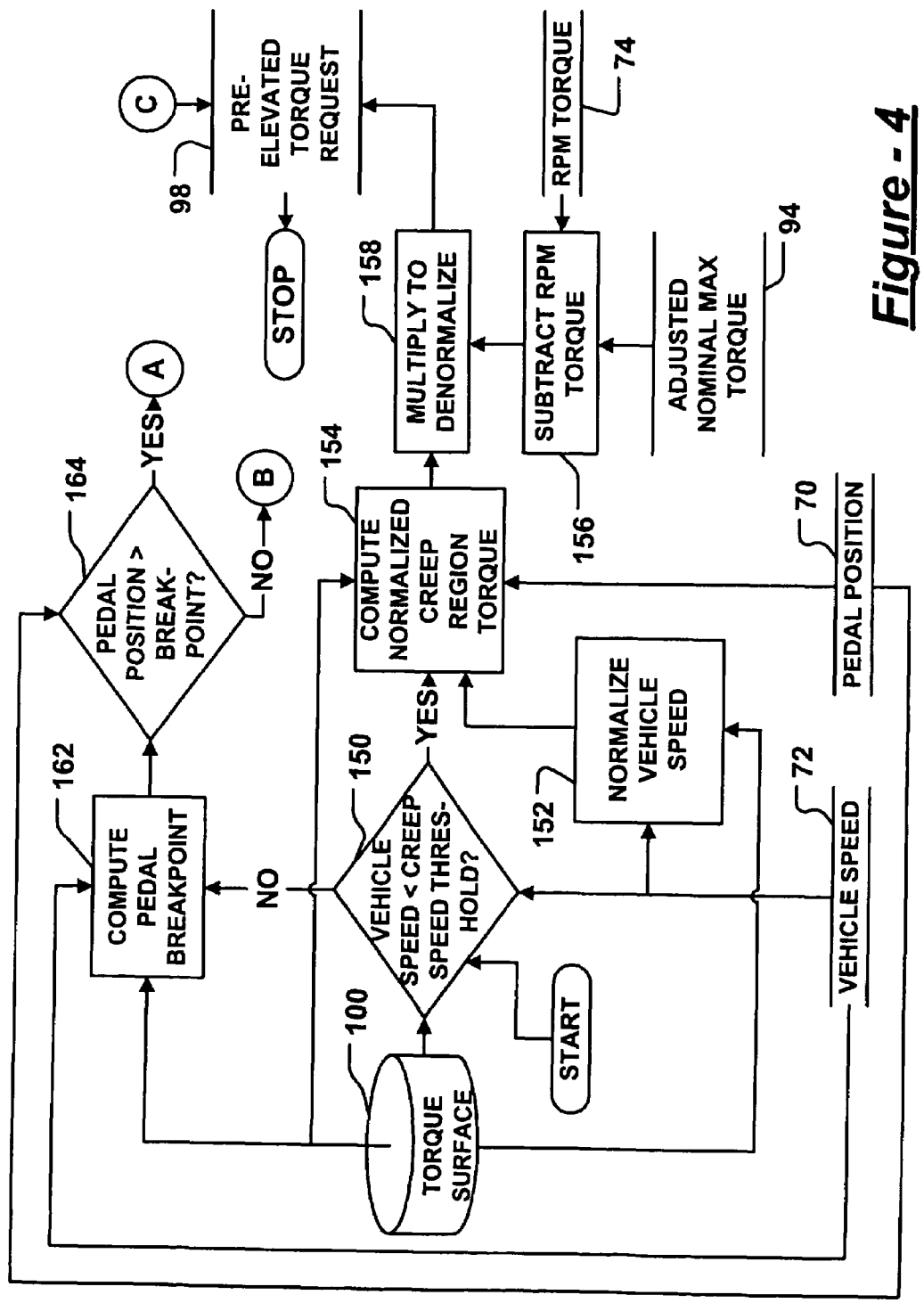
FIG. 4 is a data flow diagram illustrating a first portion of the torque request generation method according to the present invention.

Turning to FIG. 4, the method of the present invention includes comparing the vehicle speed 72 to a creep speed threshold of the three-dimensional torque surface of datastore 100 as at 150. Based on whether the vehicle speed 72 exceeds the creep speed threshold, it is selectively determined whether to calculate a coast down region torque request versus a creep region torque request. These calculation techniques follow different procedures.

Computing a creep region torque request includes normalizing the vehicle speed 72 based on the creep speed threshold at 152. Then, a normalized creep torque is computed at 154 based on a normalized vehicle speed and the torque surface. Meanwhile, real-time coast down torque 74 is subtracted at 156 from adjusted nominal maximum axle torque 94, thereby producing a torque range. The normalized creep region torque is multiplied by the axle torque range at 158, thereby producing a de-normalized creep region torque.

Calculating the coast down region torque includes computing a pedal breakpoint at 162 based on the vehicle speed 72 respective of a pedal breakpoint curve residing in a plane formed by the first and second axes. The pedal command 70 is then compared to the pedal breakpoint.

It is then selectively determined at 164 whether to calculate a negative coast down region torque request versus a positive coast down region torque request based on whether the pedal command exceeds the pedal breakpoint. These calculations involve different procedures.

Calculating the positive coast down torque request includes normalizing the pedal command at 166 based on the pedal breakpoint as extracted from surface of datastore 100 respective of vehicle speed 72. Vehicle speed 72 is also adjusted based on the creep speed threshold at 168. A normalized positive torque is then computed at 170 based on a normalized pedal command and an adjusted vehicle speed. The normalized positive torque is then multiplied by the adjusted nominal maximum axle torque 94, which produces the positive coast down region torque request 98 (FIG. 4).

Figure 5:
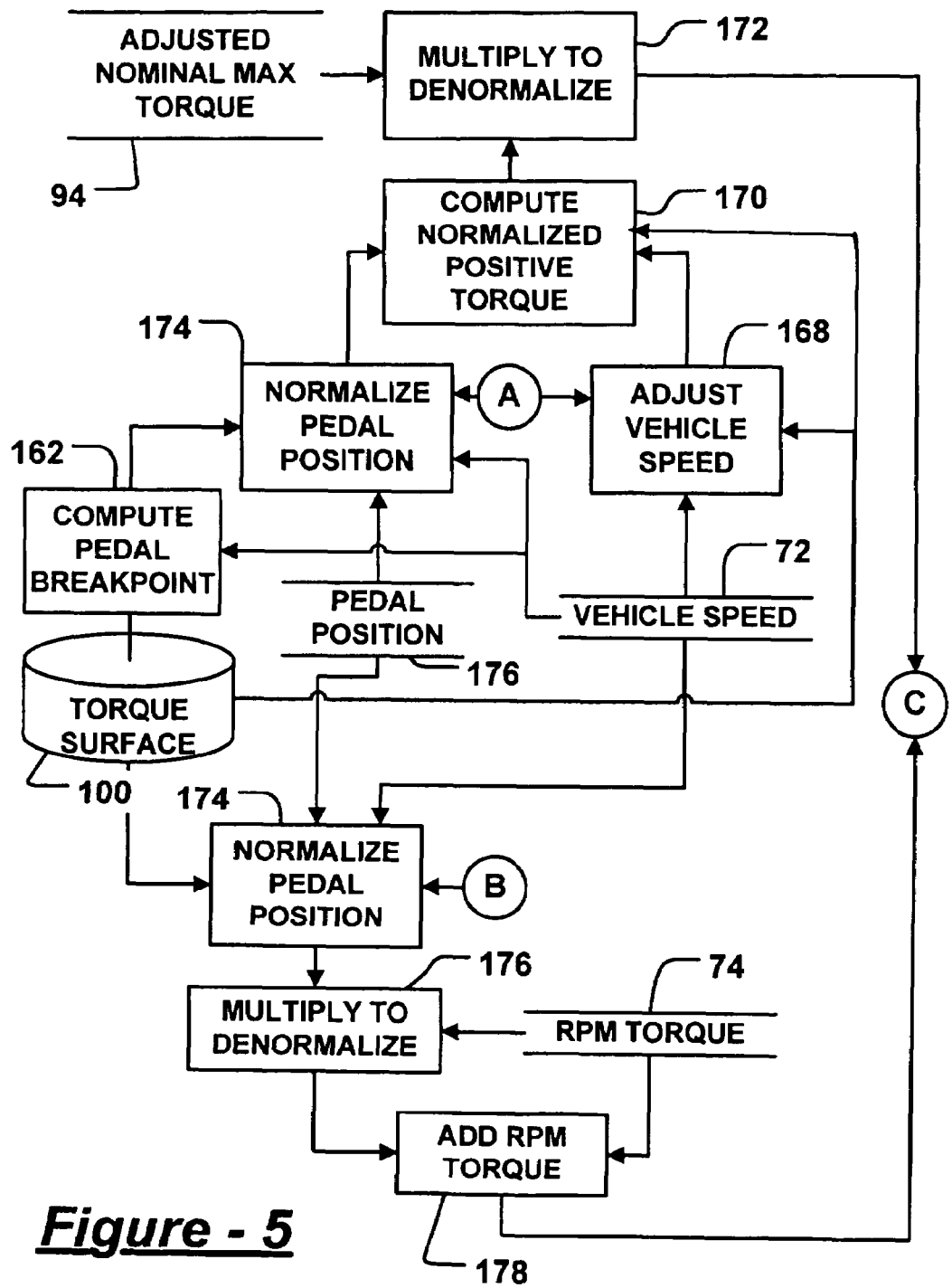
FIG. 5 is a dataflow diagram illustrating a second portion of the torque request generation method according to the present invention.

Calculating the negative coast down region torque request includes normalizing the pedal command based on the pedal breakpoint at 174 (FIG. 5). The normalized pedal command is then multiplied at 176 by a negative value of the real-time coast down torque 74, thereby producing a delta torque from the real-time coast down torque. Then the real-time coast down torque 74 is added to the delta torque, which produces the negative coast down torque request 98 (FIG. 4).

Figure 7:
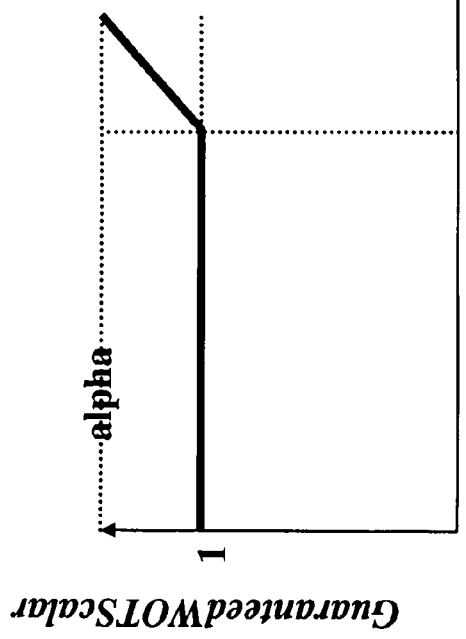
FIG. 7 is a two-dimensional graph illustrating torque request elevation based on pedal position according to the present invention.

Once pre-elevated torque request 98 is generated by module 96, the task remains to account for variability of torque capacity between individual engines. Accordingly, torque request elevation module 124 is adapted to compare pedal command 70 to a pre-determined threshold. If the pedal command 70 exceeds the threshold, then module 124 employs guaranteed max scalar 126 to elevate the torque request above the nominal maximum achievable torque. Guaranteed max scalar 126 is developed as a function of pedal position or other pedal command input device criteria, and takes on the character illustrated in FIG. 7. Accordingly, scalar 126 corresponds to a relative amount by which the pedal command exceeds the predetermined threshold. This amount is relative to an upper range of pedal command corresponding, for example, to the end of pedal travel. The result is a progressively greater elevation as the pedal or other input device as the position increases from the threshold point to the end of travel. The level alpha to which the torque request is elevated is a statistically determined factor based on a known spread of variability between engines.

The elevated torque request 128 produced by module 124 serves as the final torque request 130. It is communicated downstream to coordinated torque control system 52 by output 132. As a result, the driver experiences drivability having the aforementioned characteristics.

Figure 6B:
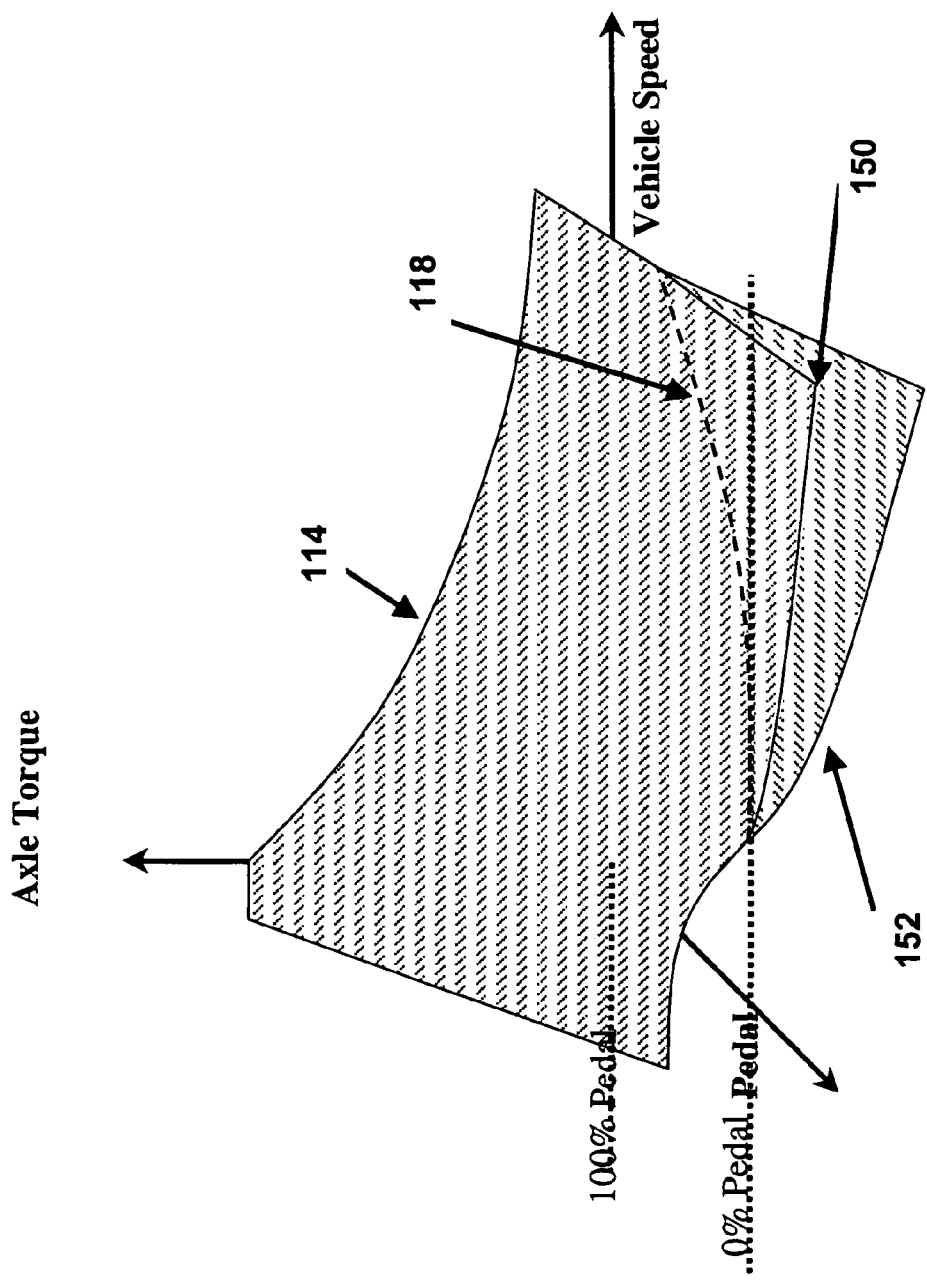

In an alternate embodiment, the surface is formed of an upper torque region 150 for the case of no engine breaking and a lower torque region 152 for the case of engine breaking as shown in FIG. 6B. In this case the pedal breakpoint curve 118 may lie anywhere along the surface formed respective of nominal maximum axle torque curve 114. The bottom end of the surface is formed of a composite creep/coast down torque curve in a plane parallel to the vehicle-speed-axle-torque plane. This composite creep/coast down torque is the torque required to deliver the desired creep and coast-down behavior of the vehicle. This curve changes as a function of the desired level of engine braking. As more engine braking is desired, the curve drops below that for the case of no engine braking as shown in FIG. 6B. If the pedal command is above the pedal breakpoint, the surface will be used as is to calculate the torque request. If the pedal command is below the pedal breakpoint an adjustment may need to be calculated if engine braking is desired.

The process used to calculate the torque request using this alternate surface of FIG. 6B is shown in FIG. 9A. The normalized axle torque surface 154 is combined with adjusted nominal max torque 94 and the pedal breakpoint 156 as described above.

The pedal command from the surface needs to be adjusted for idle speed control to avoid dead pedal. This adjustment is accomplished by comparing the rpm torque 158 to the creep/coast down torque 160 at the time of transition 162 out of idle speed control as illustrated in FIG. 9B. This idle delta axle torque 164 is added to the driver request and ramped out as a function of time.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A torque request generation system for use with a coordinated torque control system of a vehicle, comprising:
   an input receiving a vehicle speed and an axle torque command;
   a datastore recording a three-dimensional torque surface defined by a coordinate system having a first axis related to the axle torque command, a second axis related to the vehicle speed, and a third axis related to an axle torque request; and
   a torque request generation module accessing said datastore and generating a torque request based on a correlation between the axle torque command and the vehicle speed respective of the three-dimensional torque surface, wherein said torque request generation module compares the vehicle speed to a creep speed threshold of the three-dimensional torque surface, and selectively calculates one of a coast down region torque request and a creep region torque request based on whether the vehicle speed exceeds the creep speed threshold.

2. The system of claim 1, wherein calculating said coast down region torque request includes said torque request generation module computing a pedal breakpoint based on the vehicle speed respective of a pedal breakpoint curve residing in a plane formed by the first and second axes, comparing a pedal command to the pedal breakpoint, and selectively determining whether to calculate a negative coast down region torque request versus a positive coast down region torque request based on whether the pedal command exceeds the pedal breakpoint.

3. The system of claim 2, wherein said torque request generation module normalizes the pedal command based on the pedal breakpoint, adjusts the vehicle speed based on the creep speed threshold, computes a normalized positive torque based on a normalized pedal command and an adjusted vehicle speed, and multiplies an adjusted nominal maximum axle torque by the normalized positive torque, thereby producing the positive coast down region torque request.

4. The system of claim 2, wherein said torque request generation module normalizes the pedal command based on the pedal breakpoint, multiplies a normalized pedal command by a negative real-time coast down torque, thereby producing a delta torque based on the real-time coast down torque, and adds a positive real-time coast down torque to the delta torque, thereby producing the negative coast down torque request.

5. The system of claim 1, wherein calculating said creep region torque request includes said torque request generation module normalizing the vehicle speed based on the creep speed threshold, computing a normalized creep region torque based on a normalized vehicle speed and a pedal command, subtracting a real-time coast down torque from an adjusted nominal maximum axle torque, thereby producing an axle torque range, and multiplying the normalized creep torque by the axle torque range, thereby producing a de-normalized creep region torque.

6. A torque request generation system for use with a coordinated torque control system of a vehicle, comprising:
   an input receiving a vehicle speed and an axle torque command;
   a datastore recording a three-dimensional torque surface defined by a coordinate system having a first axis related to the axle torque command, a second axis related to the vehicle speed, and a third axis related to an axle torque request;
   a torque request generation module accessing said datastore and generating a torque request based on a correlation between the axle torque command and the vehicle speed respective of the three-dimensional torque surface; and
   a torque request elevation module that compares a pedal command to a predetermined threshold, and elevates the torque request above a nominal maximum achievable torque as a function of an amount by which the pedal command exceeds the predetermined threshold relative to an upper range of pedal command.

7. The system of claim 6, wherein an upper range of elevation accounts for statistical variability between vehicle engine capabilities relating to maximum achievable torque.

8. A torque request generation method for use with a coordinated torque control system of a vehicle, comprising:
   receiving an axle torque command from a driver input device;
   receiving input indicating vehicle speed;
   generating a torque request based on a correlation between the axle torque command and the vehicle speed respective of a three-dimensional torque surface residing in processor memory and defined in terms of a coordinate system having a first axis related to the axle torque command, a second axis related to the vehicle speed, and a third axis related to the axle torque request;
   comparing the vehicle speed to a creep speed threshold of the three-dimensional torque surface; and
   calculating one of a coast down region torque request and a creep region torque request based on whether the vehicle speed exceeds the creep speed threshold.

9. The method of claim 8, wherein calculating the coast down region torque request includes:
   computing a pedal breakpoint based on the vehicle speed respective of a pedal breakpoint curve residing in a plane formed by the first and second axes;
   comparing a pedal command to the pedal breakpoint; and
   selectively determining whether to calculate a negative coast down region torque request versus a positive coast down region torque request based on whether the pedal command exceeds the pedal breakpoint.

10. The method of claim 9, further comprising:
   normalizing the pedal command based on the pedal breakpoint;

adjusting the vehicle speed based on the creep speed threshold;

computing a normalized positive torque based on a normalized pedal command and an adjusted vehicle speed; and multiplying an adjusted nominal maximum axle torque by the normalized positive torque, thereby producing the positive coast down region torque request.

11. The method of claim 9, further comprising:

normalizing the pedal command based on the pedal breakpoint;

multiplying a normalized pedal command by a negative real-time coast down torque, thereby producing a delta torque based on the real-time coast down torque; and adding a positive real-time coast down torque to the delta torque, thereby producing the negative coast down region torque request.

12. The method of claim 8 wherein calculating the creep region torque request includes:

normalizing the vehicle speed based on the creep speed threshold;

computing a normalized creep torque based on a normalized vehicle speed and the pedal command;

subtracting a real-time coast down torque from an adjusted nominal maximum axle torque, thereby producing an axle torque range; and multiplying the normalized creep torque by the axle torque range, thereby producing a de-normalized creep region torque.

13. A torque request generation method for use with a coordinated torque control system of a vehicle, comprising:

receiving an axle torque command from a driver input device;

receiving input indicating vehicle speed;

generating a torque request based on a correlation between the axle torque command and the vehicle speed respective of a three-dimensional torque surface residing in processor memory and defined in terms of a coordinate system having a first axis related to the axle torque command, a second axis related to the vehicle speed, and a third axis related to the axle torque request;

comparing a pedal command to a predetermined threshold; and elevating the torque request above a nominal maximum achievable torque as a function of an amount by which the pedal command exceeds the predetermined threshold relative to an upper range of pedal command.

14. The method of claim 13, further comprising statistically determining an upper range of elevation based on variability between vehicle engine capabilities relating to maximum achievable torque.

* * * * *